(12) United States Patent
Guttromson et al.

(10) Patent No.: US 11,664,662 B1
(45) Date of Patent: May 30, 2023

(54) ADAPTIVE CONTROLLER FOR FORCED OSCILLATION SUPPRESSION IN THE GRID

(71) Applicants: National Technology & Engineering Solutions of Sandia, LLC, Albuquerque, NM (US); T&D Consulting LLC, Butte, MT (US)

(72) Inventors: Ross Guttromson, Albuquerque, NM (US); Daniel Trudnowski, Butte, MT (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/346,482

(22) Filed: Jun. 14, 2021

(51) Int. Cl.
*H02J 3/24* (2006.01)
(52) U.S. Cl.
CPC .............. *H02J 3/241* (2020.01); *H02J 3/242* (2020.01); *H02J 2300/22* (2020.01); *H02J 2300/28* (2020.01)
(58) Field of Classification Search
CPC ........ H02J 3/241; H02J 3/242; H02J 2300/22; H02J 2300/28

USPC .......................................................... 307/102
See application file for complete search history.

(56) References Cited

U.S. PATENT DOCUMENTS 11,005,401 B1 * 5/2021 Howard ................ H02M 1/325

* cited by examiner

*Primary Examiner* — Hal Kaplan
(74) *Attorney, Agent, or Firm* — Daniel J. Jenkins (57) ABSTRACT

A control system and method for an inverter-based resource device provided in a synchronous power grid. The control system includes at least one inverter based resource device connected to an electrical power system, and a controller module. The inverter based resource device includes a reference power Pref, a combination module and a transfer function. The inverter based resource device injects modulated power into the power system. The power system (which is represented by a transfer function in the control system) receives an undesirable forced oscillation, which is connected to a measuring device. A controller module processes the measured output and provides a control signal to the inverter based resource device. The controller is arranged to suppress a forced oscillation detected in the power system.

20 Claims, 4 Drawing Sheets

ADAPTIVE CONTROLLER FOR FORCED OSCILLATION SUPPRESSION IN THE GRID

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to control systems for inverter based resources in a power grid. The application relates more specifically to an adaptive controller for forced oscillation suppression in a power grid.

A forced oscillation, or FO, is a power system's steady-state response to a cyclic input typically caused by malfunctioning generator control equipment, cyclic loads, etc. With the advent of wide-area time-synchronized measurements, recorded forced oscillations are becoming more common with frequencies ranging from 0.1 Hz to 10 Hz. Forced oscillations may cause undesired overuse of equipment. In some cases, the ramifications can be dangerously catastrophic. The typical solution is to automatically detect the existence of the forced oscillation and locate its source so the faulty equipment can be remedied.

Modern grids are rapidly integrating increasing proportions of non-synchronous generation sources such as wind and solar, as well as energy storage devices such as batteries. These emerging devices are typically interconnected to the grid via inverter systems. In many cases, these inverters enable near instantaneous change in the injected power. Emerging standards for an Inverter Based Resource, or IBR, such as IEEE P2800 for transmission connected IBR interconnection, establish requirements for IBR performance. Although this standard may not require the ability to use IBRs to manage wide-area stability, guidelines include IBR related stability issues, which inherently includes transmission responses. In time, IBRs may be expected to contribute to the improvement of overall transmission system stability.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a control system for an inverter based resource device in a power distribution grid. The control system includes at least one inverter based resource device connected to an electrical power system, and a controller module. The inverter based resource device includes a reference power Pref, a combination module and a transfer function. The inverter based resource device injects power into the power system. The power system includes a transfer function, to receive a forced oscillation source. The transfer function is arranged to generate an output value to a measuring device. A controller module processed the measured output and provides supervisor control of the inverter based resource device. The controller is arranged to suppress a forced oscillation detected in the power system transfer function.

Another embodiment relates to a method for controlling an inverter based resource device to suppress forced oscillation in a radial transmission system. The method includes providing an inverter based resource device connected to an electrical power system; suppressing a forced oscillation; detecting the forced oscillation at a predetermined measurement point; setting a tuned frequency of a band-pass filter frequency HF based on the forced oscillation frequency; setting a control compensator value Hc, in response to the detected forced oscillation having the tuned frequency; tuning a control compensator value to cancel a gain and phase of a measured power value; and setting a gain value Kc; generating a feedback signal c with the gain value in response to the band-pass filter frequency HF and the control compensator value Hc; transmitting the feedback signal to the inverter based resource device; and modulating a real-power output of the inverter based resource device in response to the forced oscillation.

Another embodiment relates to a control method for suppressing forced oscillation in a power system. The control method includes detecting a forced oscillation signal; passing the forced oscillation signal thru a band-pass (BP) filter that focuses on the desired bandwidth for an oscillation detection; passing the band-pass filtered signal through a squaring function and squaring the filtered signal; passed the squared signal thru a low-pass filter estimating the moving mean of the squared signal and is matched to the BP filter; generating a square root of the low-pass filtered signal; wherein the output signal is an RMS value of the forced oscillation signal in the bandwidth of the band-pass filter.

Certain advantages of the embodiments described herein are mitigation of the impact of a forced oscillation on the power grid and to suppress the forced oscillation via controlled devices. The solution includes automatically inducing a second oscillation into the power grid which cancels the impact of the forced oscillation without the need for locating the source of the original forced oscillation.

Other advantages include a robust tuned feedback-control suppression method; expansion of the method to multiple IBR devices; and development of a supervisory system to automate the application of the feedback controller. Another advantage is the ability of the control method to identify and adapt to changing forced oscillation frequency and continue suppression as the suppression frequency changes with time.

Another advantage is a novel suppression control method which modulates controllable devices to automatically cancel the impact of a forced oscillation without the need for locating the source of the original forced oscillation. The method is based upon a tuned feedback controller and is applicable to multiple devices. Once a forced oscillation is detected and its frequency is estimated, a tuned filter and compensator are automatically inserted to modulate controllable devices such as inverter-based resources to cancel the impact of the forced oscillation.

An advantage of using a feedback method for suppression is to avoid a condition where unwanted oscillations are induced into the system if the forced oscillation detection fails, such as might occur with an open-loop design. Another advantage of the feedback method is that the control method can be automated as demonstrated in this paper.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

The disclosure relates to a control system for an inverter based resource device or devices in a power distribution grid. The control system includes inverter based resource devices connected to an electrical power system, and a controller module. The control system includes a controller module that obtains feedback from the power grid, and modulates an existing inverter based resource that is connected to the electrical power system. The inverter based resource device includes a reference power $P_{ref}$, a combination module and a transfer function. The inverter based resource device injects power into the power system. The power system is described by transfer functions $G_1$ and $G_2$, and is modulated by an undesirable forced oscillation source r. The power system is sampled, sending an output value to a measuring device $H_{pmu}$. A Supervisory controller module processes the measured power system output and provides supervisory control of the inverter based resource device. The supervisory controller is arranged with other control elements ($H_c$, $H_f$ and $K_c$) to generate a control signal that will suppress a forced oscillation detected in the power system.

Figure 1:
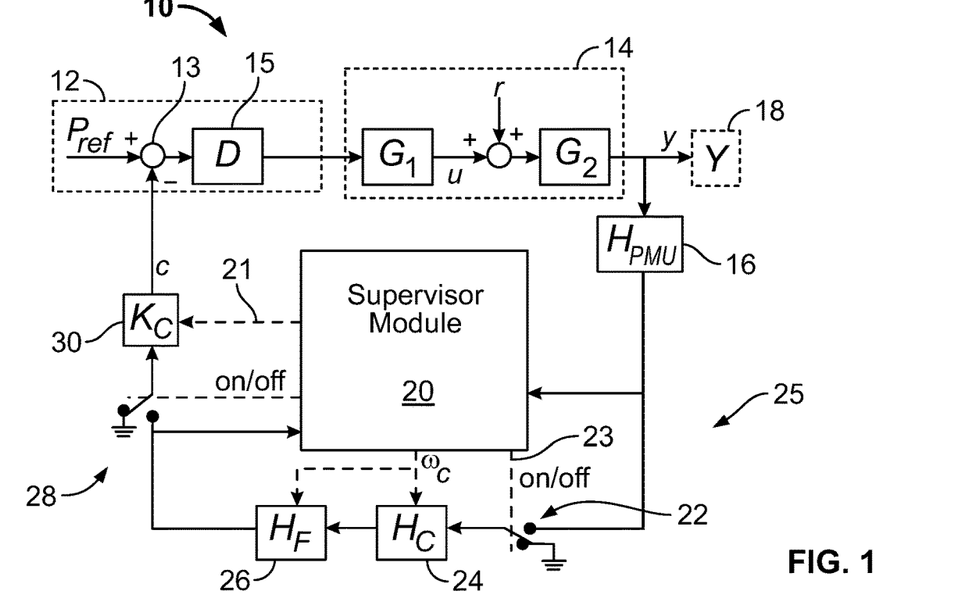
FIG. 1 shows a control loop diagram for an exemplary tuned feedback controller of the present invention.

Referring to FIG. 1, a control loop diagram for a tuned feedback controller 10 is shown. The control loop 10 begins at an IBR device 12 which is to be modulated. A modulation feedback signal c is added to the reference power $P_{ref}$ of the IBR Device at combination module 13 and the output of module 13 is forwarded to a transfer function 15 representing the real-power injection device, e.g., IBR, dynamic brake, or energy storage device. IBR Device 12 modulates power into a power system described by transfer functions 14 which includes a rogue forced oscillation source r. The output of a first transfer function $G_1$ of the synchronous power system 14 is added with r to generate the input to transfer function $G_2$ representing an arbitrary division of the synchronous power system 14, or $G_1G_2$. The rogue forced oscillation r is injected at an unknown location somewhere into the power system. The forced oscillation induced by r is measured by a measurement device 16 at output 18 representing a measured value y in system 10. Measurement device 16 has a transfer function $H_{PMU}$ of a measurement device, potentially a phasor measurement unit, or PMU (not shown). The measured signal is then passed from measurement device 16 thru a switching unit 22 to a compensator filter 24 characterized by a control compensator transfer function $H_c$. $H_c$ forwards the compensated signal to a band-pass filter 26, having a transfer function $H_F$, and the filtered signal is input to gain $K_c$ 30 resulting in the modulation signal c. The measurement point selection for y represents a critical point in system 10 that is selected to suppress the oscillation. Selection of measurement point y depends on the power system's topology. An adaptive method which utilizes the inherent robustness advantages of feedback control is described below. Adaptive refers to the ability of the controller to follow the forced oscillation and continue suppression if/as it changes with time.

The control method may be implemented through feedback controller 10 via an automated supervisor module 20. The process starts with the detection of a forced oscillation. Supervisor module 20 sets the feedback control parameters for suppressing the forced oscillation and generates a control gain $K_c$ at gain module 30. Supervisor module 20 also determines the frequency, $w_c$, at which the forced oscillation is occurring, as well as whether an oscillation is occurring. The output of feedback controller 10 modulates the real-power output of the participating IBRs. Supervisor module 20 monitors performance of feedback controller 10 continuously and shuts down the control loop 25 when a forced oscillation is no longer detected. Supervisor module 20 continuously operates oscillation detection and control logic. Module 20 includes control logic in response to oscillation detection, control settings, trigger logic and weight assignment parameters. Control loop is shut down automatically by operation of switching units 22, 28 which disconnect control loop 25 when in an open state as determined by supervisor module 20. Supervisor module 20 receives real-time wide-area time-synchronized measurements such as a PMU network from measurement device 16. Measurement device 16 is configured with sufficient bandwidth to detect the oscillatory behavior of forced oscillation.

Feedback controller 10 is tuned to suppress steady-state forced oscillation where the following parameters are defined for IBR device 12:

D=A real-power injection device (e.g., IBR, dynamic brake, or energy storage device).

$G_1$ and $G_2$=Arbitrary division of the synchronous power system, $G_1G_2$.

r=A "rogue" forced oscillation being injected at an unknown location somewhere into the power system.

$\omega_c$=Fundamental frequency of r in radians per second (rad/s) (note $f_c=2\pi/\omega_c$ Hz)

$H_{PMU}$=A measurement device (a PMU is assumed).

y=A measurement point in the power system.

$H_F$=Band-pass filter tuned to frequency $\omega_c$±10%.

$H_c$=Control compensator.

$K_c$=Control gain.

c=controller output control signal.

Supervisor module 20 provides a first control layer. Communication link 23 controls switching unit 22 and communication link 21 controls gain value $K_c$ at gain module 30. The real-time feedback control loop 25 is indicated by solid lines. Supervisor module 20 detects the oscillation at y, automatically sets the parameters for $H_F$ and $H_c$, switches the feedback control switches 22, 28 to the "On" state, and then ramps in the control gain Kc. The output signal generated at gain module 30 is signal c, in response to control settings received from communication link 21 Supervisor module 20 then monitors the feedback controller's performance and shuts down the feedback control loop when the oscillation disappears. If the oscillation is detected and quantified at frequency $w_c$, $H_F$ band-bass filter 26 is automatically tuned to $w_c$. Compensator $H_c$ is automatically tuned to cancel the gain and phase of $(DG_1G_2H_{PMU})$ at frequency $w_c$. Supervisor module 20 also adapts to changing FO frequency and changes $w_c(t)$ accordingly. Gain $K_c$ is automatically set to a maximum safe value. Feedback control loop 25 is then turned on and the gain $K_c$ is slowly increased to this design value determined by supervisor module 20. The forced oscillation is then suppressed. Once oscillation FO suppression input c goes below a pre-determined threshold for an extended time, supervisor module 20 switches the feedback control loop to the Off state at switching units 22, 28.

A. The Feedback Method

The feedback control method is based upon adaptive gain scheduling and the internal model principal. With $(DG_1G_2H_{PMU})$ and $w_c$ known, the compensator and gain ($H_c$ and $K_c$) are automatically calculated based on loop-shaping theory. The total loop gain is set as high as possible at frequency $w_c$ with the phase at 0° while maintaining a minimum gain margin of 6 dB and a minimum phase margin of 45°.

Equations 1, 2(a) and 2(b) generate the foundation parameters for band-pass filter 26, compensator 24, and control gain 30, assuming the frequency $w_c$ is known. The equations are in the Laplace transform, or frequency, domain. Variable s is the Laplace operator. Letting $s=jw_c$ transforms the equation to the frequency domain at frequency $w_c$. In the following equations, a capital letter denotes a signal in the frequency domain and lower-case letters indicate time domain (e.g., R vs r).

Referring to FIG. 1, an open-loop y is calculated from $$Y(s)=Y_R(s)+Y_P(s) \quad \text{EQ. (1);}$$

$$Y_R(s)=G_2(s)R(s) \quad \text{EQ. (2a)}$$

$$Y_P(s)=D(s)G_1(s)G_2(s)P_{REF} \quad \text{EQ. (2b)}$$

where EQ. (2a) is the component of y due to rogue input r, and EQ. (2b) is the component of y due to $P_{ref}$ of IBR device 12. We are interested in $y_R$. In closed-loop, $y_R$ is calculated from $$Y_R(s) = \frac{G_2(s)R(s)}{1+L(s)} \quad \text{EQ. (3)}$$

where L(s) is the loop transfer function of:

$$L(s)=D(s)G_1(s)G_2(s)H_{PMU}(s)H_c(s)H_F(s)K_c \quad \text{EQ. 4}$$

Clearly from (3), the larger $|L(j\omega_C)|$, the more $y_R$ is suppressed. $H_c$ is tuned to cancel the gain and phase of $(DG1G2HPMU)$ at frequency $\omega_c$ resulting in $$H_c(j\omega_c) = \frac{1}{D(j\omega_c)G_1(j\omega_c)G_2(j\omega_c)H_{PMU}(j\omega_c)} \quad \text{EQ. (5)}$$

Band-pass filter $H_F$ is defined by the 2nd-order transfer function with damping ratio ç:

$$H_F(s) \triangleq \frac{2\zeta\omega_c s}{s^2 + 2\zeta\omega_c s + \omega_c^2} \quad \text{EQ. (6)}$$

By design, $H_F(j\omega_c)=1\angle 0°$. Inserting EQ. (5) and EQ. (6) into EQ. (4) at =results in EQ (7):

$$L(j\omega_c)=K_c \quad \text{EQ. (7)}$$

Because the band-pass filter's gain peaks at $\omega_c$, $K_c$ can be large. A suppression gain $G_s$ is defined as the amount the FO is suppressed from open-loop to closed-loop. Comparing EQ. (2a) and EQ. (3), the suppression gain at a general frequency $\omega$ is $$G_s(j\omega) = \left|\frac{1}{1+L(j\omega)}\right| \quad \text{EQ. (8)}$$

Using EQ. (7), suppression gain at the FO frequency is $$G_s(j\omega_c) = \frac{1}{1+K_c} \quad \text{EQ. (9)}$$

Therefore, the larger $K_c$, the higher the suppression.

Referring to FIG. 1, if the controller is operating correctly, an oscillation will be induced at u that cancels the rogue oscillation from r. That is, the closed-loop transfer function from r to u will ideally be $1\angle 180°$ at frequency $\omega_c$. Assuming $p_{ref}=0$ in FIG. 1, this transfer function is $$\frac{U(s)}{R(s)} = \frac{-L(s)}{1+L(s)} \quad \text{EQ. (10a)}$$

To study the properties at frequency $\omega_c$, we let $s=j\omega_c$ and apply (7) to get $$\frac{U(j\omega_c)}{R(j\omega_c)} = \frac{-K_c}{1+K_c} = \frac{K_c}{1+K_c}\angle 180° \quad \text{EQ. (10b)}$$

Therefore, from EQ. (10b), the larger $K_c$ the closer we get to the ideal gain and phase of $1\angle 180°$.

A critical design factor is the damping ratio (ç) of $H^F$. If the forced oscillation frequency is exactly known and is at $\omega_c$, then a very small ç is possible which will result in a very large Kc. In reality, the frequency cannot be exactly estimated, and may not be stationary. Therefore, controller 10 must perform for forced oscillations within a range of $\omega_c$. Many oscillation estimation methods are based upon FFT windowing where the window size dictates the accuracy of the frequency estimate with a frequency resolution being 1/z-Hz where z- is the window size in sec. For example, a 20 sec. window has a frequency resolution of 0.05 Hz. Using known filtering and windowing methods, frequency estimation is possible within 10% of the actual frequency. Therefore, a design requirement is for control system 10 to perform for all oscillations within the 0.9 $\omega_c$ to 1.1 $\omega_c$ range. A ç=0.1 satisfies this requirement.

B. Tuning $H_c$

EQ. (5) represents the key design requirement for compensator $H_c$. This first requires the frequency response of $(DG_1G_2H_{PMU})$ be known which can be obtained via transient stability models using first principles, or Eigen-analysis, or a simple chirp simulation. Another method is to use system ID method within the actual system. For realistic applications, once a model $(DG_1G_2H_{PMU})$ is obtained, it will likely not significantly change with operating conditions as its properties will often be dominated by the IBR device D and the topology of the power system.

A relatively simple compensator $H_c$ is preferred which enables an auto-tuning algorithm by the supervisor module 20. In realistic applications $(DG_1G_2H_{PMU})$ will be a phase-lag system, therefore, $H_c$ will be phase lead. A simple phase-lead controller is $$H_c(s) = \frac{K(\alpha T s + 1)}{T s + 1} \qquad \text{EQ. (11)}$$

where $\alpha > 1$. Using a standard phase-lead design method, design parameters $\alpha$ and T are automatically set to cancel the phase of $(DG_1G_2H_{PMU})$ at frequency $\omega_c$. This is achieved by setting the maximum phase point of $H_c$ at co. The gain K is then set to cancel the gain of $(DG_1G_2H_{PMU})$ at frequency co. In the following, $G=(DG_1G_2H_{PMU})$, then the design equations 12(a), (b) and (c) are represented below:

$$\alpha = \frac{1 + \sin(-\angle G(j\omega_c))}{1 - \sin(-\angle G(j\omega_c))} \qquad \text{EQ. (12a)}$$

$$T = \frac{1}{\omega_c \sqrt{\alpha}} \qquad \text{EQ. (12b)}$$

$$K = \frac{|(1 + j\omega_c T)|}{|(1 + j\omega_c \alpha T) G(j\omega_c)|} \qquad \text{EQ. (12c)}$$

Equations 12(a), 12(b) and 12(c), are valid if $0 \geq \angle G(j\omega_c) > -90°$. If $\angle G(j\omega_c) < -90°$, then multiple phase lead terms are cascaded.

The gain $K_c$ is selected to the maximum while maintaining the loop's gain and phase margins within the required levels. Conservative stability designs typically require a minimum of 6 dB gain margin and a minimum of 45° of phase margin to assure loop stability.

Figure 2A:
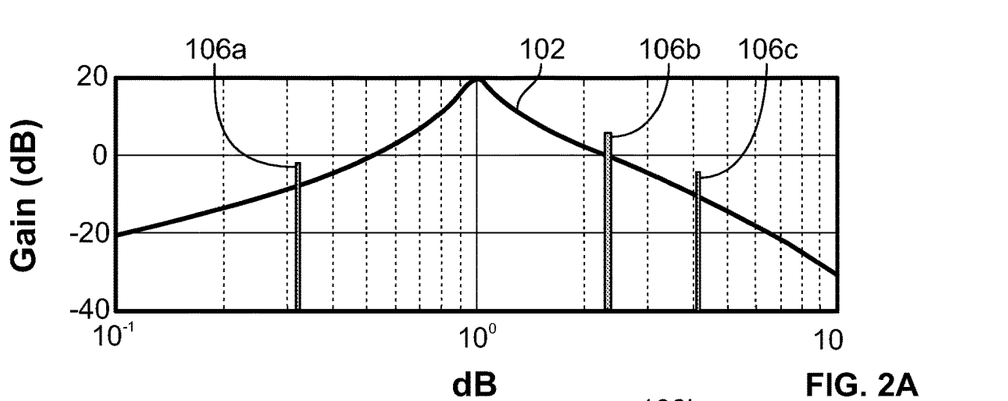
FIG. 2A shows a gain profile for a linear system loop transfer function of the control loop of FIG. 1.
Figure 2B:
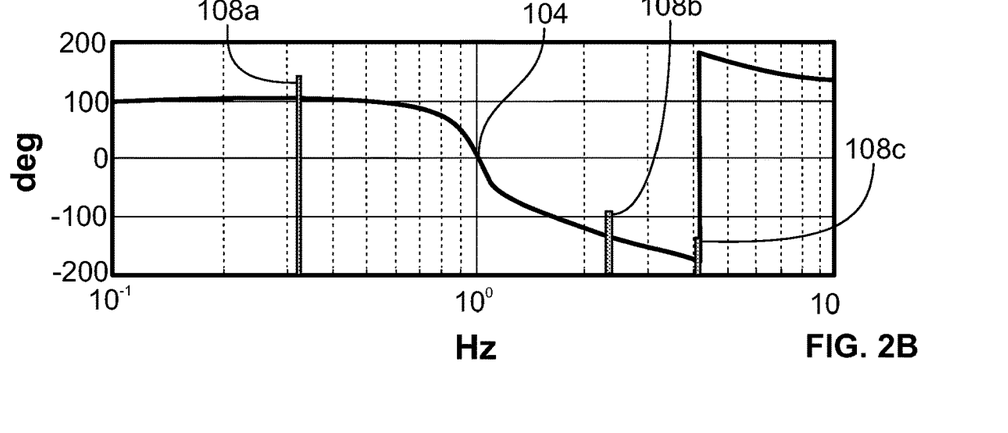
FIG. 2B shows a phase profile for a linear system loop transfer function of the control loop of FIG. 1.

An exemplary linear system loop transfer function from EQ. (4) is shown in FIGS. 2A and 2B. wherein $L(j\omega)$ with $f_c=1$ Hz. Vertical markers 106a, 106b and 106c indicate margin points for the gain profile 102 (FIG. 2A) and vertical markers 108a, 108b, and 108c indicate the margin points for the phase profile 104 (FIG. 2B). In the example of FIGS. 2A and 2B, $$D(s) = \frac{20}{s + 20} \qquad \text{EQ. (13a)}$$

$$G_1(s)G_2(s) = \frac{10}{s + 10} \qquad \text{EQ. (13b)}$$

$$H_{PMU}(s) = 1 \qquad \text{EQ. (13c)}$$

If $f_c=1$ Hz, the resulting controller, gain, and filter are computed by EQ. (13d), (13e) and (13f) as follows:

$$H_c(s) = \frac{0.455(0.432s + 1)}{020586s + 1} \qquad \text{EQ. (13d)}$$

$$K_c = 9.40 \qquad \text{EQ. (13e)}$$

$$H_F(s) = \frac{1.26s}{s^2 + 1.25s + 39.5} \qquad \text{EQ. (13f)}$$

Markers 106a, b and c indicate the key gain margin points and markers 108a, b and c indicate the key phase margin points. Note that the design meets the minimum 6 dB gain margin and the 45° phase margin requirements. With the $K_c$ value in EQ. (13e), expected suppression is near 90%.

Figure 2C:
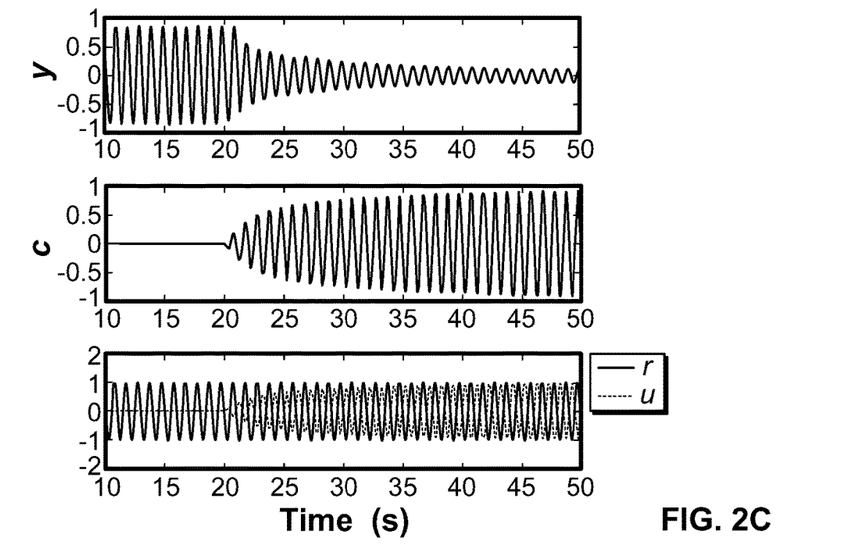
FIG. 2C shows the time domain results of the simulation profiles in FIGS. 2A and 2B.

FIG. 2C shows the time domain results of the simulation illustrated by FIGS. 2A and 2B, wherein $$r(t) = \sin(2\pi t) = 1.0 \text{ Hz FO} \qquad \text{EQ. (14)}$$

The detected forced oscillation frequency is assumed to be $f_c=1.0$ Hz. Also, assuming 20 sec. for detection to occur and for controller 10 to ramp in over 40 seconds. The time-domain results of signals c, r, y, and u, as indicated in FIG. 1, are illustrated. As indicated by the graph y, significant suppression of the oscillation in y is shown, and u is 180° out of phase from r.

Figure 3:
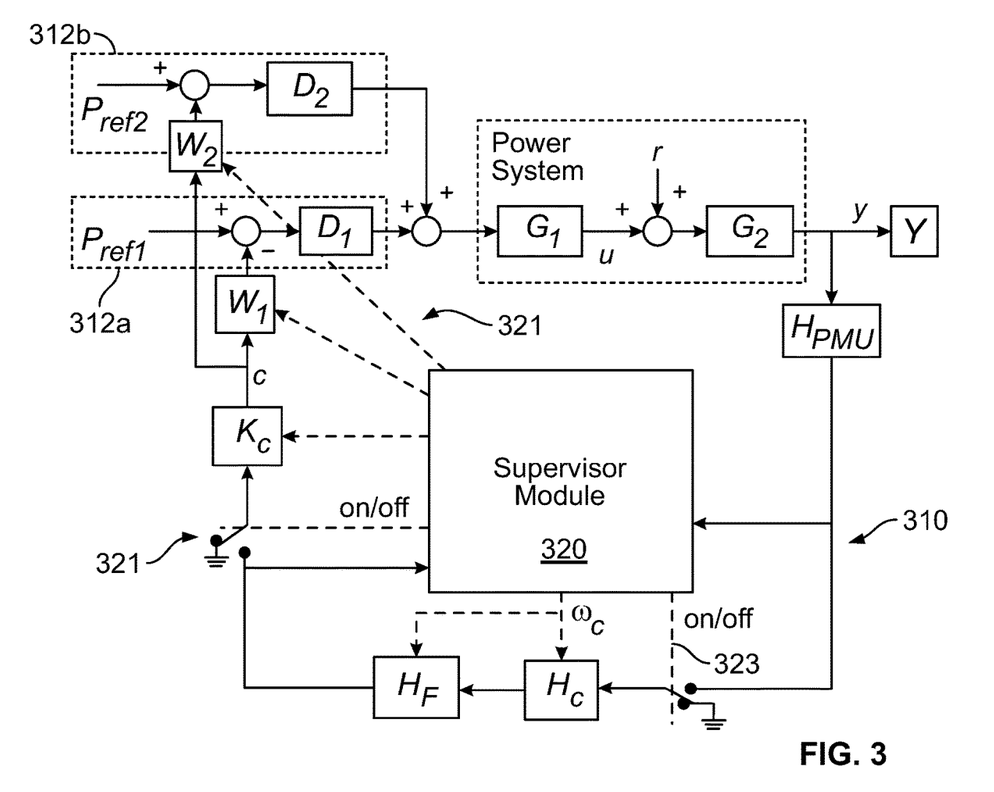
FIG. 3 shows N alternate embodiment for a feedback controller for controlling multiple IBR devices.

Referring next to FIG. 3, in an alternate embodiment a feedback controller 310 is shown for controlling multiple IBR devices 312a, 312b connected in parallel. For example, a wind farm may comprise multiple turbines, each having an independent inverter.

FIG. 3 shows an expanded feedback controller 310 for multiple devices 312a, 312b. In the example of FIG. 3, two IBR devices are shown but it should be understood that the configuration may include three or more devices. Control signal c is distributed to n devices via weights $W_1$ thru $W_n$. Weights $W_1$, $W_2$ are scaled as shown in EQ. (15):

$$\Sigma_{i=1}^n W_i = 1 \qquad \text{EQ. (15)}$$

Weights $W_1$ thru $W_2$ distribute the required modulation among the devices and can be tailored to the headroom of each device. In this case, D is defined by EQ. (16):

$$D(s) = \Sigma_{i=1}^n W_i D_i(s) \qquad \text{EQ. (16)}$$

Selection of the weights enables one to dynamically distribute the control action according to the available capacity of the devices. In the example that follows, the weights are distributed according to the rating of the controlled units. Another method would be set the weights based upon available headroom below the current operating point of each device.

Supervisor module 320 sets the real-time control settings via links 321, 323, indicate by dotted lines, and automatically implements the feedback control method by conducting the following main steps: a). detect the FO and quantify its fundamental frequency $f_c$; b) Set the feedback control parameters via EQs. (6) and (12); c) set device weights $W_1$ thru $W_n$; d) ramp in the control gain $K_c$; and e) monitor the controller to shut down when the FO has ceased or its fundamental frequency has changed.

Steps a) through e) indicated above must be automatically conducted. Step b) is set by EQs. (6) and (12) after $f_c$ is determined at step a) for $\omega_c = 2\pi f_c$. Step c) is set by monitoring the available headroom of each device 312a, 312b. Step d) is completed by linearly ramping the gain over many cycles of the oscillation. In a typical embodiment, 10 or more cycles of oscillation may be the ramp function interval, so as to avoid any significant initialization transients.

Figure 4:
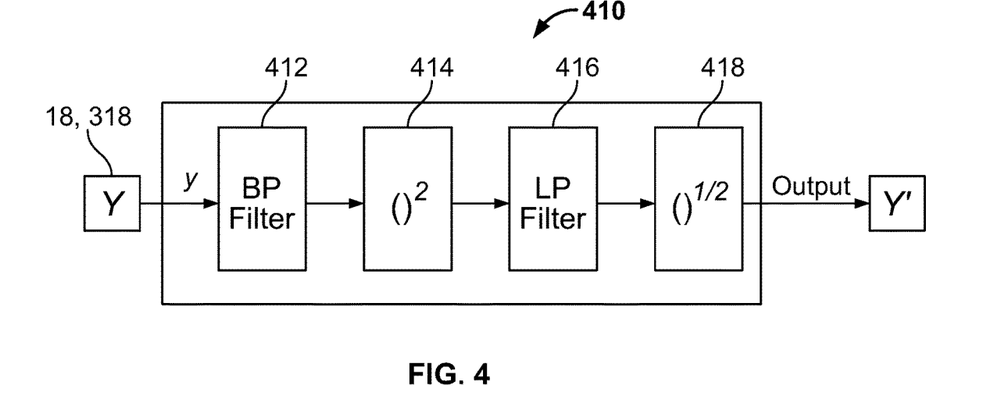
FIG. 4 shows general RMS energy bandpass filter to implement the control method of the present invention.

Automated methods are well-known for detecting FO and quantifying fundamental frequency $f_c$ at step 1. In one embodiment shown in FIG. 4, a general RMS energy filter 410 is used to implement step a). A signal of interest y is passed thru a band-pass (BP) filter 412 that focuses on the desired bandwidth for oscillation detection. After BP filtering by filter 412, filtered signal y is then passed to a squaring function 414 and squared. The squared output signal y is next passed thru a low-pass (LP) filter 416, and the square root of output signal y is generated at box 418. LP filter 416 estimates the moving mean of the squared signal y and is matched to the BP filter. The resulting output signal y' will be the RMS of the input signal in the bandwidth of the BP filter. In a preferred embodiment, multiple parallel RMS energy filters each with a specific BP setting may be employed. If the RMS energy filter output exceeds a pre-determined threshold, an oscillation alarm may be set and a Fast Fourier Transform (FFT) operation conducted on y. The maximum FFT bin in the bandwidth of the RMS filter corresponds to the fundamental frequency of the forced oscillation and sets $f_c$. Four parallel RMS energy filters to detect an oscillation wherein:

0.01 Hz to 0.15 Hz—the speed governor band;
0.15 Hz to 1 Hz—inter-area oscillation band;
1 Hz to 5 Hz—local mode and controls band;
5 Hz to Nyquist—high-frequency band.

The forced oscillation may not be a pure sinusoid, e.g., a square-wave forced oscillation function. In this case, the estimated frequency will be the fundamental frequency of the wave-form and the controller will address this frequency.

Step e) is executed by monitoring the output c of the suppression controller. Once the amplitude of c stays below a predetermined minimum threshold, the feedback controller is shut down. The frequency of the forced oscillation is monitored by the supervisor module 20 during the controller operation. If the frequency shifts is greater than 10% from the nominal, supervisor module 20 will shut down and then re-start at the new frequency.

In an alternate embodiment, supervisor module may also be configured to shut down the controller during major transient events.

The control method success requires that the system define the critical measurement y where suppression is desired. This involves three basic components including a) the measurement location within the grid; b) the type of measurement parameter, e.g., real-power or voltage magnitude; and c) the requirements of the measurement devices and communication system.

With respect to the location selection for measuring y, the power-system example described in greater detail below uses an interconnection point of a radial sub-system into a bulk grid. In such a case, the obvious critical measurement location is the interconnection point as the goal is to avoid inducing any forced oscillations into the bulk system from the radial system. Applying the method to other configurations such as a meshed network is possible; but defining the critical measurement location may be more complex. Any selection method must carefully consider the specific system's topology.

With respect to the type of measurement parameter type, the example focuses on suppressing a real-power oscillation because this case is common and most troublesome. Alternately, the method may also focus on suppressing forced oscillations in other measurable signal types, such as voltage magnitude and system frequency. The measurement system must be configured with a bandwidth, sampling rate, and reliability to accurately measure the forced oscillation in real-time.

Figure 5:
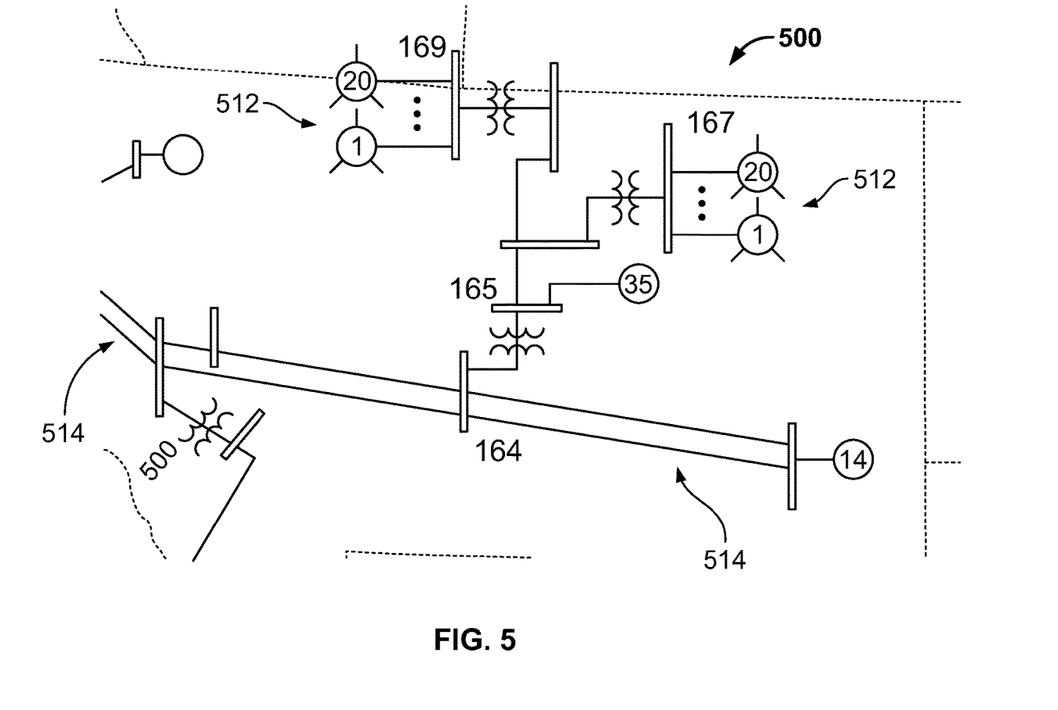
FIG. 5 shows an exemplary radial sub-system of a bulk grid.

Referring next to FIG. 5, an exemplary radial sub-system 500 is shown. It is understood that sub-system 500 is one of many sub-systems that are interconnected through a bulk grid 514 which may cover multiple states and/or territories. Bulk grid 514 includes load buses dispersed throughout the bulk grid radial transmission system. The overall system includes thirty-five synchronous generators each represented using a sub-transient model, a turbine model, and a detailed excitation system. Sub-system 500 also includes two inverter-based power plants at buses 167 and 169, each consisting of twenty IBR.

The portion of sub-system 500 shown in FIG. 5 is the radial interconnection point into the bulk system at bus 164, The radial interconnect of sub-system 500 comprises a 400 MW gas-fired-turbine synchronous generator 35 connected at bus 165.

20 IBRs 512 are connected at bus 167. Each IBR in 512 has a maximum power rating of 3 MW. Another 20 IBR 512 are shown being connected to sub-system 500 at bus 169. Ten of the IBR have a maximum power rating of 3 MW each and the remaining 10 have a maximum power rating of 1.5 MW each.

Figure 6:
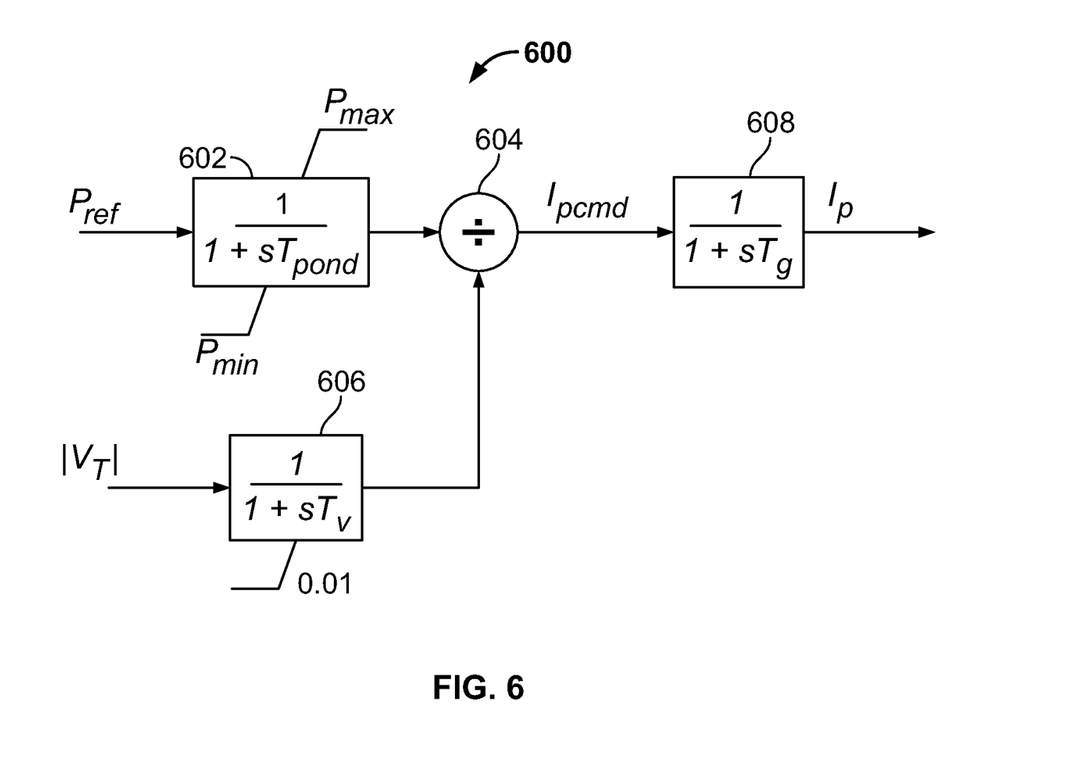
FIG. 6 shows a simplified dynamic model for real-power current injection of each IBR represented in the sub-system of FIG. 5.

The real-power current injection of each IBR 12 (FIG. 1) is represented mathematically in FIG. 6 by dynamic model 600. Dynamic model 600 is consistent with a grid-following device. The parameters for each IBR 12 in the exemplary model 600 are $T_{pord}$=0.1 sec. for all units, as indicated in transfer function module 602. Module 602 receives an input reference power $P_{REF}$ which is applied to transfer function module 602 and the output power value applied to a divider module 604. At $T_V$=0.05 sec. for all units, and at bus 167: $T_g$=0.05 sec; at bus 169: the voltage $V_T$ absolute value is applied to transfer function module 606 to generate an output voltage value that is input to a second input of divider module 604. Divider module 604 outputs a current command value $I_{pcmd}$ at transfer function 608 wherein $T_g$=0.05 sec. for 3 MW units, 0.1 sec. for 1.5 MW units. Each transfer function module 602, 606, 608 equation multiplies the input value by $1/1+sT_x$ where x corresponds with the relevant sampling time of the input signal.

A suppression control system is added to the IBR 512 connected to bus 169 using the exemplary configuration in FIG. 4, having twenty devices wherein for $D_i$, i=1, . . . ,20. The weights W are scaled according to the rating of each unit:

$$W_i=3/45 \text{ for } i=1, \ldots, 10 \quad \text{EQ. (17a)}$$

$$W_i=1.5/45 \text{ for } i=11, \ldots, 20 \quad \text{EQ. (17b)}$$

The key forced oscillation measurement location to suppress any forced oscillations is at the interconnection into the bulk system 514 at bus 164. That is, the real-power flowing from bus 165 to bus 164 via an interconnecting transformer, therefore:

$y=P_{165-164}$=real power flow from bus 165 to 164.

With $f_c=1$ Hz, the resulting phase-lead controller, gain, and filter are characterized by equations (18a), (18b) and (18c), respectively, as follows:

$$H_c(s) = \frac{0.314(0.695s + 1)}{0.0365s + 1} \quad \text{EQ. (18a)}$$

$$K_c = 11.7 \quad \text{EQ. (18b)}$$

$$H_F(s) = \frac{1.26s}{s^2 + 1.26s + 39.5} \quad \text{EQ. (18c)}$$

Note that the exemplary design meets the minimum 6 dB gain margin and the 45° phase margin requirements. For $K_c=11.7$, a suppression gain of 0.079 (92% suppression) is expected.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the adaptive controller for forced oscillation suppression, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A control system for an inverter based resource device in a power system comprising:
    at least one inverter based resource device connected to an electrical power system, and a controller module;
    the inverter based resource device comprising a reference power $P_{ref}$, a combination module and an inverter transfer function; the inverter based resource injecting power into the power system;
    the power system comprising a power transfer function, to receive a forced oscillation source; the power transfer function configured to generate an output; and
    a controller module to provide supervisory control of the inverter based resource device, the controller module configured to suppress a forced oscillation detected in the power system transfer function.

2. The control system of claim 1, wherein the controller module is further configured to:
    detect the forced oscillation at a predetermined measurement point;
    set a tuned frequency for a band-pass filter frequency $H_F$ and a control compensator value $H_c$, in response to the detected forced oscillation having the tuned frequency;
    tune the control compensator value to cancel a gain and phase of a measured power value; and
    set a gain value $K_c$ of a gain module to generate a feedback signal c in response to the band-pass filter frequency $H_F$ and the control compensator value $H_c$;
    wherein the feedback signal is transmitted to the combination module of the inverter based resource device transfer function to modulate a real-power output of the at least one inverter based resource device in response to the forced oscillation.

3. The control system of claim 2, wherein the controller module is further configured to: modulate the gain module automatically wherein $K_c$ is gradually increased to a maximum value.

4. The control system of claim 2, wherein the controller module is further configured to: shut down the feedback signal by switching a feedback control loop to the Off state at a first switching unit connected in series with the control compensator and the band-pass filter; and a second switching unit connected in series with a gain module for Kc.

5. The control system of claim 2, wherein a control module continuously operates an oscillation detection mode and a control logic, the control logic configured to generate the feedback signal in response to a detected oscillation, generate a plurality of control settings, provide a trigger logic and set weight assignment parameters.

6. The control system of claim 2, wherein the forced oscillation is measured by a measurement unit comprising a phasor measurement unit in communication with the power system, the phasor measurement unit being configured to detect an oscillatory behavior of the forced oscillation.

7. The control system of claim 1, wherein the controller module is further configured to: monitor the power system and shut down the feedback signal in response to the forced oscillation being undetected.

8. The control system of claim 1, wherein the power transfer function comprises a forced oscillation added to a first grid transfer function G1 of the synchronous power system to generate a second grid transfer function G2.

9. A method for controlling an inverter based resource device to suppress forced oscillation in a radial transmission system, the method comprising:
providing an inverter based resource device connected to an electrical power system,
suppressing a forced oscillation;
detecting the forced oscillation at a predetermined measurement point;
setting a tuned frequency of a band-pass filter frequency $H_F$ based on the forced oscillation frequency;
setting a control compensator value $H_c$, in response to the detected forced oscillation having the tuned frequency;
tuning a control compensator value to cancel a gain and phase of a measured power value;
setting a gain value $K_c$;
generating a feedback signal c with the gain value in response to the band-pass filter frequency $H_F$ and the control compensator value $H_c$;
transmitting the feedback signal to the inverter based resource device; and
modulating a real-power output of the inverter based resource device in response to the forced oscillation.

10. The method of claim 9, further comprising:
monitoring the power system; and
shutting down the feedback signal in response to the forced oscillation being undetected.

11. The method of claim 10, wherein the step of shutting down the feedback signal further comprises:
switching a feedback control loop to the Off state at a first switching unit connected in series with the control compensator and the band-pass filter; and
switching to the Off position a second switching unit connected in series with a gain module for Kc.

12. The method of claim 10, further comprising:
modulating the gain module automatically by gradually increasing gain value $K_c$ to a maximum value.

13. The method of claim 10, further comprising:
generating a transfer function of the power system comprising a forced oscillation;
adding the forced oscillation to a first grid transfer function $G_1$ of the synchronous power system; and
generating a second grid transfer function $G_2$.

14. The method of claim 10, further comprising:
continuously operating an oscillation detection mode and a control logic,
generating the feedback signal in response to a detected oscillation;
generating a plurality of control settings;
providing a trigger logic; and
setting weight assignment parameters associated with an inverter based resource device.

15. The method of claim 9, wherein the forced oscillation is measured by a measurement unit comprising a phasor measurement unit in communication with the radial transmission system, the phasor measurement unit being configured to detect an oscillatory behavior of the forced oscillation.

16. A control method for suppressing forced oscillation in a power system, comprising:
detecting a forced oscillation signal y;
passing the forced oscillation signal through a band-pass (BP) filter that focuses on the desired bandwidth for an oscillation detection;
passing the band-pass filtered signal through a squaring function and squaring the filtered signal;
passing the squared signal thru a low-pass filter;
estimating the moving mean of the squared signal y that is matched to the BP filter; and
generating a square root of the low-pass filtered signal y;
wherein an output signal is an RMS-value of the forced oscillation signal in the bandwidth of the band-pass filter.

17. The control method of claim 16, further comprising:
providing a plurality of RMS energy filters; and
providing a distinct range of band-pass filter frequencies for each RMS energy filter.

18. The control method of claim 17, further comprising:
a speed governor band-pass frequency range is 0.01 Hz to 0.15 Hz for a speed governor band;
an inter-area oscillation band-pass frequency range is 0.15 Hz to 1 Hz;
a local mode and controls band-pass frequency range is 1 Hz to 5 Hz; and
a high-frequency band-pass frequency range is 5 Hz to Nyquist.

19. The control method of claim 18, further comprising:
generating an alarm in response to at least one RMS energy filter output exceeding a predetermined threshold value; and
conducting a Fast Fourier Transform (FFT) operation conducted on the measured parameter;
wherein a maximum FFT range in the bandwidth of the RMS filter corresponds to a fundamental frequency of the forced oscillation; and
setting a compensating frequency $f_c$.

20. The control method of claim 18, further comprising:
a loop transfer function $L(j\omega_c)=K_c$ with $f_c=1$ Hz;
the loop transfer function having margin points for a gain profile and a phase profile.

* * * * *